United States Patent Office 2,748,183
Patented May 29, 1956

2,748,183

ELECTROLYTE FOR DRY CELLS

Clarence K. Morehouse and Jay Y. Welsh, Hamden, Conn., assignors to Olin Mathieson Chemical Corporation, a corporation of Virginia No Drawing. Application October 28, 1952,
Serial No. 317,366

4 Claims. (Cl. 136—103)

This invention relates to improvements in dry cells of the Leclanche type, and more particularly to an improved electrolyte for such cells.

As is known, such electrolyte consists of a starch paste containing certain salts, such as zinc chloride and ammonium chloride. In the present practice, the paste is gelatinized by treatment in a hot water bath during the manufacture of the cell.

Heretofore, cereal flours and starches have been used as the electrolyte gelling agent. During discharge of the cell, the starch becomes degraded and the electrolyte liquefies. In so doing, it increases in volume and tends to cause swelling of the cell. Internal pressure is thus developed which tends to force the viscous electrolyte through any crevices which may exist in the top closure, and through any perforations in the side walls of the can. The exuded electrolyte is so viscous that it is absorbed very slowly by the material of the cell jacket. It, therefore, leaks past the jacket, and due to its corrosive nature, causes damage to the equipment with which the cell is being used. The starch content of conventional cereal pastes used in dry cell electrolytes also undergoes chemical degradation in the presence of electrolyte and depolarizing agents, particularly when the cells are stored at high temperatures.

The foregoing difficulties are avoided or greatly minimized by the use of certain modified starches as the gelling agent. The useful modified starches consist of granules which have been reacted in an ungelatinized condition with an ether-forming reagent containing at least two functional groups so that the granules have the property of inhibited gelatinization when dispersed in water under normal gelatinization conditions. Suitable ether-forming bifunctional reagents are compounds such as epichlorohydrin, propylene dichloride, glycerol dichlorohydrin or dichlorobutane, which may be used to produce modified starches as described in United States Patent No. 2,500,950 issued March 21, 1950, to M. Konigsberg.

As described in the patent, modified starches can be produced of varying degrees of inhibition. For example, a slightly inhibited modified starch can be produced by the treatment of ungelatinized tapioca starch with 0.05% of its weight of epichlorohydrin and highly inhibited modified starch can be prepared by the treatment of cornstarch in ungelatinized form, with 2% or more of its weight of epichlorohydrin. The chemical reaction of the bifunctional ether-forming reagent with starch consists principally in the formation of an ether linkage with two hydroxyl groups of the starch per molecule of the reagent, a substantial proportion of which is believed to result in cross linking of starch molecules. The effect of the treatment is displayed as an inhibition of the gelatinization of the modified starch when it is dispersed in water under normal gelatinization conditions.

The commercially available "Vulca" starches, made by National Starch Products, Inc., are modified starches of this character. Various grades of this material are available, such as 30, 60 and 100, the degree of inhibition increasing with the designating numeral. In the case of the "Vulca" starches, the degree of inhibition or swelling is demonstrable by a test in which 5 grams of starch are mixed with 100 grams of water and heated for 20 minutes at close to 100° C. After allowing the mixture to stand for 24 hours in a one hundred cc. graduate, the volume of the starch which has settled out is determined. In this test, an unmodified starch, such as cornstarch, yields no settled starch since the mixture has been gelled. "Vulca" 30 yields approximately 72–80 cc. of settled material, "Vulca" 60 yields approximately 35–40 cc. and "Vulca" 100 yields about 20 cc. or less of settled material. "Vulca" 100 is representative of a highly inhibited modified starch while "Vulca" 60 is representative of a modified starch which has been inhibited to a medium extent.

We have obtained best results by using as the electrolyte gelling agent a blend of approximately equal parts of a modified starch having a high degree of inhibition with a modified starch having a medium degree of inhibition. Such blends present the best combination of ease of handling together with resistance to leakage and excellent performance. Other blends may likewise be useful, for example "Vulca" 30 blended with about twice its weight of "Vulca" 100. The preferred electrolyte contains about 5 to 15% zinc chloride and 15 to 25% ammonium chloride in an aqueous solution. About 0.25% mercuric chloride may be added as inhibitor. Of course, other electrolytic salts or combination of salts may be employed and the invention is in no way limited to the salts employed in the electrolyte.

Preferably, 0.4 to 0.5 gram of modified starch are used per cc. of electrolyte, best results with respect to capacity and resistance to leakage being obtained with the use of 0.45 gram of modified starch per cc. of electrolyte. With the use of the above modified starch blends, it has been found that the zinc chloride concentration should be maintained at below about 15%, for example at 13%, in order to avoid handling difficulties due to thickening of the electrolyte.

The preferred procedure in the preparation of the electrolyte-modified starch mixture is to subject about 65% of the material to a pre-gelling treatment at a temperature between 80° C. and 95° C. for a period of 5–11 minutes. This mixture is cooled to 40° C. and mixed with the remainder of the electrolyte and the modified starch.

With this exception, the assembly of dry cells utilizing the above modified starch as the gelling agent may proceed along conventional lines. As usual, an insulating washer may be placed at the bottom of the zinc can, the proper quantity of electrolyte paste added and the depolarizer bobbin with central carbon pencil inserted and centralized. The electrolyte is then gelatinized by subjecting to treatment in a hot water bath. After the cells have been cooled, a top washer is inserted, a wax or pitch sealing material is added and the assembly of the cell is completed by insertion of a suitable top closure and the application of a suitable jacket. Preferably, the top closure and jacket construction are in accordance with the construction disclosed and claimed in the Reinhardt and Welsh application, Serial No. 230,391, filed June 7, 1951.

The above description is that of a conventional method of constructing a dry cell of the Leclanche type. It is not intended to restrict the scope of the herein disclosed invention, and any other method of assembling the zinc can, depolarizer, carbon pencil and electrolytic paste may be employed.

By means of our invention a dry cell is produced showing excellent performance characteristics combined with an outstanding degree of resistance to leakage or swelling of the cell. Any liquid which escapes through perforations in the zinc can is quite fluid and is rapidly absorbed by the inner layer of the jacket, being thus prevented from penetrating to the exterior of the dry cell where it might cause damage. Cells of this construction have been shown to provide consistently better results in a variety of tests for resistance to leakage than any commercially available leak-resistant or leak-proof cell. Probably the most severe such test is to short-circuit a cell for a period of 21 days, whereby commercial leakproof cells display serious leakage in 40–100% of cells tested. Cells of the above construction have shown no serious leakage under this test and only a small percentage, 10 to 30%, show slight leaks.

The cells of the present invention also display increased capacity, that is, have a longer useful life than otherwise identical cells made with conventional starch gelling agent. It is believed that such improved capacity may be brought about because of greater imbibition of the electrolyte by the depolarizer bobbin than is the case with conventionally gelled electrolytes. The resulting swelling of the bobbin effects better contact between the depolarizer material and the central carbon pencil. An added benefit of the modified starch gelling agent is increased chemical stability of the cell, particularly as shown by improved retention of capacity after storage at elevated temperatures. The modified starches resist oxidative attack by manganese dioxide and other depolarizers and also chemical degradation by the electrolyte.

With the use of a modified starch blend in accordance with our preferred procedure, the electrolyte paste in the completed cell has a novel structure. It comprises an assemblage of granules of modified starch, each saturated with electrolyte, retained in place by a matrix of electrolyte which has been thickened by the substantial portion of the modified starch granules gelatinized during the pre-gelling and cooking treatments.

It is noteworthy that the addition of any substantial amount of unmodified starch to the modified starch gelling agent will result in the loss of the above-outlined advantages of the modified starch gelling agent. The loss of these advantages is brought about by the addition of only several per cent of unmodified starch. Likewise, the advantages are lost on admixture of other starches, such as those available under the trade names "Amioca" and "Clear-flow."

The experimental evidence indicates that the advantages are obtainable only with modified starches in which the granular form has been retained and the gelatinizeability of which has been inhibited by treatment with a bifunctional ether-forming reagent to an extent sufficient to retard the swelling and bursting of the granules when subjected to water and electrolyte solutions under conditions which would normally bring about immediate gelatinization.

We claim:

1. An electrolyte for primary cells of the Leclanche type consisting essentially of an aqueous solution of 5 per cent to 15 per cent zinc chloride and 15 per cent to 25 per cent ammonium chloride, containing 0.4 to 0.5 gram to a cubic centimeter of a modified starch which has been reacted with a bifunctional ether-forming reagent, said modified starch having the property of inhibited gelatinization when dispersed in water under normal gelatinization conditions.

2. An electrolyte in accordance with claim 1 in which the modified starch consists of a mixture of starch having a high degree of inhibition and one having a medium degree of inhibition.

3. The herein described method which comprises forming an aqueous solution containing 5 per cent to 15 per cent zinc chloride, 15 per cent to 25 per cent ammonium chloride and 0.4 to 0.5 gram to a cubic centimeter of a modified starch which has been reacted with a bifunctional ether-forming reagent and that has the property of inhibited gelatinization when dispersed in water under normal gelatinization conditions, heating a portion of such solution to pre-gell it, cooling the heated portion of the solution and mixing it with the remainder, and employing the resulting material as the electrolyte of a primary cell.

4. An electrolyte for primary cells of the Leclanche type comprising an aqueous solution of 5 per cent to 15 per cent zinc chloride and 15 per cent to 25 per cent ammonium chloride containing 0.4 to 0.5 gram to a cubic centimeter of a modified starch, the granules of which have been reacted in ungelatinized condition with a bifunctional ether-forming reagent, said modified starch having the property of resisting gelatinization to the extent that after being subjected to normal gelatinization conditions in an aqueous medium, it yields a measurable quantity of settled material upon standing.

References Cited in the file of this patent

UNITED STATES PATENTS

| 1,464,838 | Wilhelm | Apr. 14, 1923 |
| 2,399,127 | Lipinski | Apr. 23, 1946 |
| 2,500,950 | Konigsberg | Mar. 21, 1950 |

OTHER REFERENCES

"Journal of Research," National Bureau of Standards (Paste Walls and Shelf Life of Dry Cells), vol. 40, March 1948, pages 251–262; Research Paper RP 1870.